(12) United States Patent
Arikawa et al.

(10) Patent No.: US 7,901,790 B2
(45) Date of Patent: Mar. 8, 2011

(54) HIGH TEMPERATURE COMPONENT WITH THERMAL BARRIER COATING AND GAS TURBINE USING THE SAME

(75) Inventors: Hideyuki Arikawa, Mito (JP); Akira Mebata, Isohara (JP); Yoshitaka Kojima, Hitachi (JP); Kunihiro Ichikawa, Hitachinaka (JP); Takayuki Yoshioka, Sapporo (JP); Mitsutoshi Okada, Yokosuka (JP); Tohru Hisamatsu, Yokosuka (JP)

(73) Assignees: Hitachi, Ltd., Tokyo (JP); Central Research Institute of Electric Power Industry, Tokyo (JP)

( * ) Notice: Subject to any disclaimer, the term of this patent is extended or adjusted under 35 U.S.C. 154(b) by 0 days.

(21) Appl. No.: 11/233,379

(22) Filed: Sep. 23, 2005

(65) Prior Publication Data
US 2006/0251916 A1 Nov. 9, 2006

(30) Foreign Application Priority Data
Sep. 28, 2004 (JP) .................................. 2004-281377

(51) Int. Cl.
*B32B 15/00* (2006.01)
(52) U.S. Cl. ......... 428/678; 428/680; 428/632; 428/633; 416/241 R
(58) Field of Classification Search .................. 428/680, 428/678, 679, 632, 633, 666; 416/241 R
See application file for complete search history.

(56) References Cited

U.S. PATENT DOCUMENTS

| 3,874,901 | A | | 4/1975 | Rairden, III | |
|---|---|---|---|---|---|
| 4,095,003 | A | * | 6/1978 | Weatherly et al. | ............. 427/452 |
| 4,101,715 | A | | 7/1978 | Rairden, III | |
| 4,123,595 | A | | 10/1978 | Chang | |
| RE29,853 | E | * | 11/1978 | Perl | ................. 219/270 |
| 4,405,284 | A | * | 9/1983 | Albrecht et al. | ............ 415/174.4 |
| 4,585,481 | A | * | 4/1986 | Gupta et al. | ................ 106/14.05 |
| 4,588,607 | A | * | 5/1986 | Matarese et al. | .............. 427/452 |
| 4,900,640 | A | * | 2/1990 | Bell et al. | ........................ 428/633 |

(Continued)

FOREIGN PATENT DOCUMENTS

DE  699 02 316 T2  3/2003

(Continued)

OTHER PUBLICATIONS

European Office Action issued in European Patent Application No. EP 05021040.0 dated Sep. 7, 2010.

(Continued)

*Primary Examiner* — Aaron Austin
(74) *Attorney, Agent, or Firm* — McDermott Will & Emery LLP (57) ABSTRACT

There is provided a high temperature component with a thermal barrier coating, which can be used as a high temperature component for a gas turbine, an aircraft gas turbine engine, or the like. A top coat is formed of a ceramic on a bond coat, the bond coat being formed on a heat resistant alloy substrate composed mainly of at least one element of nickel and cobalt, wherein the bond coat contains at least one of nickel and cobalt, chromium and aluminum, and further contains at least one selected from a group consisting of tantalum, cesium, tungsten, silicon, platinum, manganese and boron in a range of 0 to 20 wt %. The high temperature component according to the present invention has very high durability of a thermal-insulating ceramic layer, and is less susceptible to spalling damage.

18 Claims, 3 Drawing Sheets

U.S. PATENT DOCUMENTS

| | | | |
|---|---|---|---|
| 5,176,964 A * | 1/1993 | Marousek et al. | 428/552 |
| 5,863,668 A | 1/1999 | Brindley et al. | |
| 6,001,492 A * | 12/1999 | Jackson et al. | 428/610 |
| 6,089,825 A * | 7/2000 | Walden et al. | 415/173.4 |
| 6,096,381 A | 8/2000 | Zheng | |
| 6,251,504 B1 | 6/2001 | Jaslier et al. | |
| 6,283,715 B1 | 9/2001 | Nagaraj et al. | |
| 6,376,015 B1 | 4/2002 | Rickerby | |
| 6,416,882 B1 * | 7/2002 | Beele et al. | 428/633 |
| 6,432,478 B2 | 8/2002 | Jaslier et al. | |
| 6,610,419 B1 * | 8/2003 | Stamm | 428/632 |
| 2002/0081447 A1 * | 6/2002 | Movchan et al. | 428/469 |
| 2002/0132132 A1 | 9/2002 | Bose et al. | |
| 2004/0048090 A1 * | 3/2004 | Creech et al. | 428/621 |
| 2005/0164026 A1 * | 7/2005 | Quadakkers et al. | 428/629 |
| 2005/0238907 A1 * | 10/2005 | Quadakkers et al. | 428/680 |
| 2008/0038575 A1 * | 2/2008 | Renteria et al. | 428/548 |

FOREIGN PATENT DOCUMENTS

| | | |
|---|---|---|
| EP | 1 321 541 A2 | 6/2003 |
| EP | 1 365 044 A1 | 11/2003 |
| EP | 1 380 672 A1 | 1/2004 |
| JP | 58-087273 | 5/1983 |
| JP | 60-194056 | 10/1985 |
| JP | 61-207566 | 9/1986 |
| JP | 62-211387 | 9/1987 |
| JP | 62-274062 | 11/1987 |
| JP | 63-096257 | 4/1988 |
| JP | 04-147957 | 5/1992 |
| JP | 11-268175 | 10/1999 |
| JP | 2001-329358 | 11/2001 |
| JP | 2003-183754 | 7/2003 |
| JP | 2004-256855 | 9/2004 |
| JP | 2005-534805 | 11/2005 |
| WO | WO 99/43861 | 9/1999 |
| WO | WO 03/100133 * | 12/2003 |
| WO | WO 03/100133 A1 | 12/2003 |
| WO | WO 2004/005581 * | 1/2004 |

OTHER PUBLICATIONS

L.A.J.L. Sarton et al., "Materials, Functionality & Design, vol. 1, Metals and Composites," Proceedings of the 5th European Conference on Advanced Materials and Processes and Applications 21-23 Apr. 1997.

S.L. Shinde et al., "Degradation Mechanisms in Thermal-Barrier Coatings," Ceram. Eng. Sci. Proc. (1986) 1.7 (7-8), pp. 1032-1038.

N. M. Yanar et al., "Microstructurel characterization of the failures of thermal barrier coatings on Ni-base superalloys," Materials at High Temperatures 20(4), 2003, pp. 495-506.

* cited by examiner

HIGH TEMPERATURE COMPONENT WITH THERMAL BARRIER COATING AND GAS TURBINE USING THE SAME

TECHNICAL FIELD

The present invention relates to a high temperature component with a thermal barrier coating which is made of ceramic. It also relates to a gas turbine in which at least a part of a component is composed of the high temperature component with the thermal barrier coating.

BACKGROUND OF THE INVENTION

An operating temperature of a gas turbine has been increasing year by year in order to increase the efficiency thereof. To cope with such a high operating temperature, a thermal barrier coating (which is referred to TBC hereinafter) made of ceramic has been conventionally applied to gas turbine components. As the thermal barrier coating, an MCrAlY alloy layer having high oxidation resistance and a zirconia ($ZrO_2$) based ceramic layer having low thermal conduction are generally formed on a substrate made of a nickel (Ni) based or a cobalt (Co) based alloy (see Example 1 in JP-A-62-211387, for instance). Regarding the "MCrAlY" alloy, M represents at least one element selected from a group consisting of iron (Fe), nickel and cobalt, Cr represents chromium, Al represents aluminum, and Y represents yttrium.

SUMMARY OF THE INVENTION

It is generally known that the substrate temperature can be decreased by 50 to 100° C. by the application of the TBC, although it depends on operating conditions. The TBC is very effective in compensating the heat resisting temperature of the substrate. For the TBC used under harsh thermal conditions, however, spalling or damage of the top coat (thermal-insulating ceramic layer) is liable to occur due to a difference in thermal expansion between the TBC and the substrate or a bond coat, a thermal stress caused by a sudden temperature change at the time of starting and stopping of the gas turbine, growth of an oxide layer on the interface between the bond coat and the top coat by oxidation of a metal component in the bond coat, and the like. Especially in a gas turbine with a high operating temperature, spalling of the top coat is liable to occur.

An object of the present invention is to enhance the durability of a top coat in a high temperature component with a thermal barrier coating.

According to an aspect of the present invention, a high temperature component with a thermal barrier coating is provides, the thermal barrier coating being formed of an oxide-based ceramic on a bond coat, the bond coat being formed on the surface of a heat resistant alloy substrate composed mainly of at least one element of nickel and cobalt, wherein the bond coat is formed of an alloy comprising substantially at least one element of nickel and cobalt, chromium and aluminum, and wherein the bond coat does not contain an element that is easier to be oxidized than aluminum.

According to a further aspect of the present invention, a gas turbine is provided in which the whole or a part of a gas turbine component, such as a combustor, a gas turbine bucket, or a gas turbine nozzle, is formed of the high temperature component according to the present invention.

The high temperature component according to the present invention has higher resistance to spalling in an environment of the gas turbine than the conventional high temperature component in which the top coat is formed on the bond coat made of an MCrAlY alloy. Thus, it can be adapted for high temperatures for operating the gas turbines.

Other objects, features and advantages of the invention will become apparent from the following description of the embodiments of the invention taken in conjunction with the accompanying drawings.

BRIEF DESCRIPTION OF DRAWINGS

FIGS. 4A-C are schematic cross-sectional views showing a process for forming interface oxides of TBC having an MCrAlY alloy bond coat.

FIGS. 5A-C are schematic cross-sectional views showing a process for forming interface oxides of TBC having an MCrAl alloy bond coat.

DETAILED DESCRIPTION OF THE INVENTION

Present inventors investigated causes for spalling of a top coat (thermal-insulating ceramic layer) of a TBC. The top coat is generally made of partially stabilized zirconia because of its low thermal conduction, high thermal-insulating properties, and high toughness. The partially stabilized zirconia allows oxygen to pass therethrough because it has oxygen ion conductivity. In addition, if the top coat is made porous, a vertical crack or a columnar structure is formed to relieve the thermal stress thereof. Resultant pores or cracks serve to pass further oxygen, so that the permeability of oxygen is further increased. Therefore, as oxygen is supplied to the surface of a bond coat all the time from the outside through the top coat, metal components in the bond coat is oxidized, so that an oxide layer is formed and grows at the interface between the top coat and the bond coat. At the early stage of formation of the interface oxide layer, at which the film thickness is small, a protective oxide layer composed mainly of aluminum oxides is formed, so that such formation of interface oxide layer brings about a rather favorable result in light of ensuring of adhesion between the top coat and the bond coat, preventing the metal components from being further oxidized. In actual environments, however, oxygen passes through the interface oxide layer and intrudes into the bond coat, so that the interface oxides grow.

Thereupon, the inventors investigated the growth of interface oxide layer in detail, and obtained the knowledge as described below. In the conventional TBC, the thermal barrier coating is applied via the bond coat composed of an MCrAlY alloy containing yttrium which is easier to be oxidized than aluminum because yttrium has lower oxygen equilibrium partial pressure than that of aluminum. This is because the MCrAlY alloy has been developed to be used not as the bond coat for the TBC but singly as an oxidation and corrosion resistant coating. In the case where the MCrAlY alloy is used singly as the oxidation and corrosion resistant coating, the coating surface is exposed directly to a high temperature combustion gas, and oxidized under a high oxygen partial pressure. In this case, almost all of alloy elements are generally oxidized at the same time, so that the oxide layer formed on the surface is possibly a composite oxide containing all of alloy components. Thus, it is impossible that the most protective aluminum oxide layer grows singly on the surface preferentially. In this case, generally, the oxygen partial pressure decreases gradually on the surface of the alloy layer under the oxide layer, as the oxide layer grows. Finally, although the highly protective aluminum oxide layer is formed on the surface of alloy layer, the thickness of oxide layer increases, so that spalling of oxides is liable to occur. As countermeasures against the above-described phenomenon, yttrium is added which is easier to be oxidized than aluminum. Thereby, the nucleation of oxides in the region of low oxygen partial pressure just under the surface of the alloy layer is accelerated, and the highly protective aluminum oxide layer is caused to grow preferentially at the early stage, by which high oxidation and corrosion resistance is realized. Furthermore, since yttrium is oxidized under a lower oxygen partial pressure than aluminum, their oxides are formed locally at a considerably deep position in the alloy layer. When aluminum oxides grow with the locally formed oxides being cores, the formed composite oxide layer takes a shape that cuts into the alloy layer locally and deeply so that a so-called "anchor" is dropped. As a result, the adhesion of a protective oxide to the alloy layer can be enhanced.

Figure 4A:
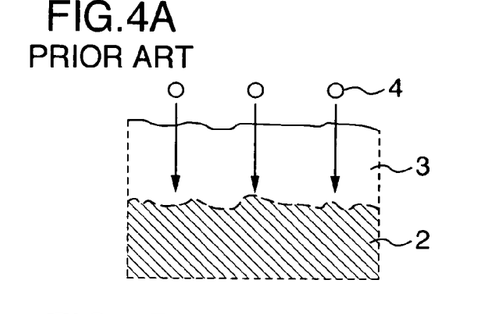
FIG. 4A shows a oxygen passing through a top coat.
Figure 4B:
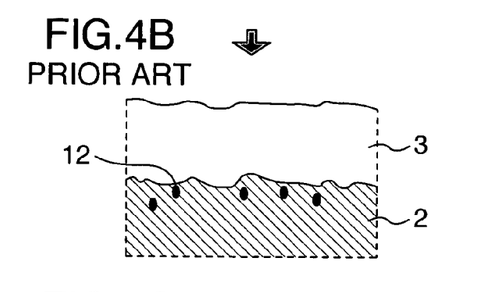
FIG. 4B shows local formation of fine particle yttrium oxides.
Figure 4C:
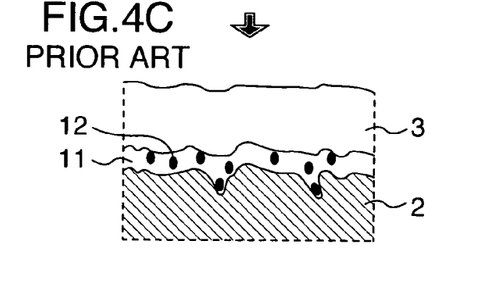
FIG. 4C shows formation of a continuous interface oxide layer including the fine particle yttrium oxides therein.

In the case where the MCrAlY alloy is used as the bond coat of TBC, however, since yttrium is contained which is easier to be oxidized than aluminum, the top coat is rather liable to be spalled. This reason is explained with reference to FIGS. 4A-C. When oxygen 4 passes through a top coat 3 and arrives at a bond coat 2 (see FIG. 4A), oxygen bonds yttrium at first to form an oxide. Since the added amount of yttrium is small, a continuous oxide film is not formed, but a fine particle oxide 12 is formed locally (see FIG. 4B). Next, an aluminum oxide grows with the fine particle oxide 12 being a core, and hence a continuous interface oxide layer 11 is formed (FIG. 4C). This interface oxide layer 11 is a composite oxide layer in which the particle oxide 12, which is an oxide of yttrium, is dispersedly included. For such a composite oxide layer, a grain boundary is easily formed at the boundary between dispersed particles and a matrix, and a microcrack is liable to occur due to a difference in thermal expansion between the dispersed particles and the matrix, so that oxygen easily passes through as compared with a pure aluminum oxide. As a method for suppressing the growth of interface oxides, a method in which the surface of the bond coat is cleaned by an ionized gas flow to remove unnecessary oxides or pollutants, and then an alumina layer is formed by oxidation, a method in which the surface of the bond coat is melted by laser irradiation in an oxygen atmosphere, by which a barrier layer of alumina is formed, and the like methods are known. However, even if such treatment is performed, alumina formed by oxidation contains yttrium, so that the passing of oxygen cannot be suppressed.

For a gas turbine to which the TBC is applied, the operating temperature thereof is often high, and hence the growth of interface oxides is further accelerated due to the high temperature. When the interface oxide layer grows and the film thickness is increased, a new thermal stress occurs in the top coat due to the accumulation of distortion caused by volume expansion at the time when the metal components are oxidized, a change in thermal and mechanical properties from metal to oxide, and the like, so that the top coat is liable to be damaged. In addition, due to the increased film thickness, the interface oxide layer itself is liable to be subjected to delamination or spalling at the interface. Furthermore, as the interface oxide layer grows, aluminum in the bond coat is lost by oxidation, so that the oxidation of chromium takes place, and finally nickel and cobalt are oxidized. As chromium, nickel and cobalt have greater volume expansion during oxidation than aluminum, further relatively porous oxides are formed. In this state, the interface oxide layer is easily subjected to delamination, which resultantly leads to the spalling of top coat.

Based on the above-described results of the investigation, the top coat is formed on a heat resistant alloy substrate composed mainly of nickel or cobalt via a bond coat comprising substantially an alloy of chromium, aluminum and at least one element of nickel and cobalt in the present invention.

Figure 3:
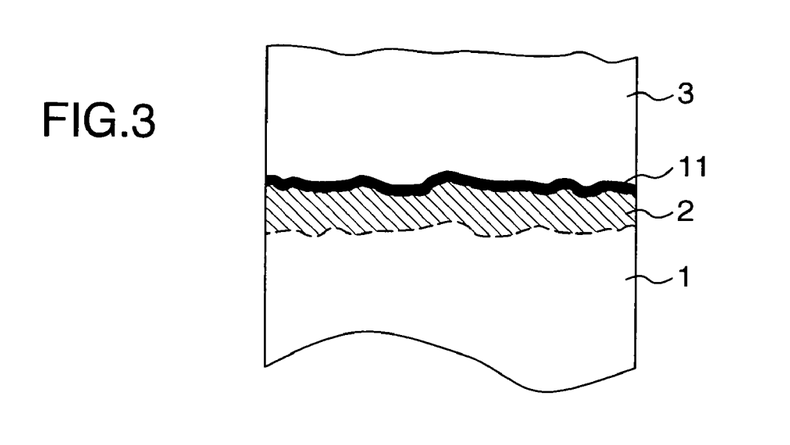
FIG. 3 is a schematic cross-sectional view of a high temperature component after oxidation of the component to which a TBC is applied.
Figure 5A:
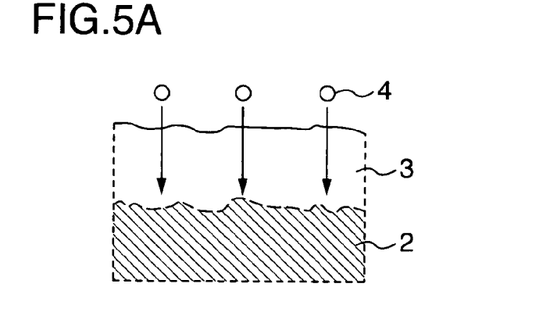
FIG. 5A shows a oxygen passing through a top coat.
Figure 5B:
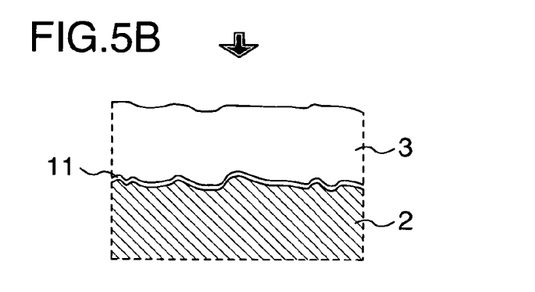
FIGS. 5B and 5C shows formation of a continuous interface oxide layer consisting substantially of aluminum oxide.
Figure 5C:
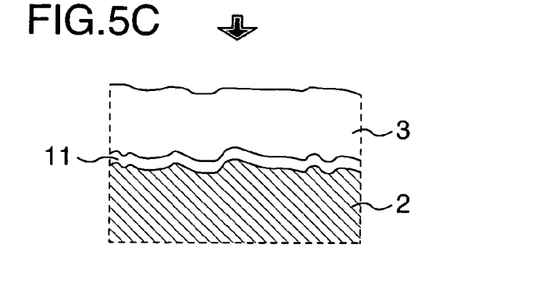

When the high temperature component of the present invention is used at a high temperature, the interface oxide layer 11 is formed at the interface of the bond coat 2 and the top coat 3, as shown in FIG. 3. Oxygen passing through the top coat 3 is limited as compared with the case where the top coat 3 is absent, so that the oxygen partial pressure on the surface of the bond coat 2 is relatively low. In addition, no element that is oxidized more easily than aluminum is contained in the bond coat 2. Therefore, aluminum that is the most oxidizable among the components of the bond coat 2 is oxidized preferentially. As a result, unlike the case where the MCrAlY alloy is used for the bond coat, a substantially pure aluminum oxide is formed as the interface oxide layer 11, as shown in FIG. 5A-C. The interface oxide layer thus formed does not contain the oxide of an element that is easier to be oxidized than aluminum, so that grain boundary or microcrack caused by such an oxide occurs less often, and the oxygen permeability is very low. As a result, an effect of significantly suppressing the growth of the interface oxide is achieved, and very high durability is exhibited. Therefore, in the case where the high temperature component is used for the bucket or nozzle etc. of a gas turbine having a very high combustion gas temperature, due to the excellent high-temperature durability thereof, the top coat tends to be subjected to no damage such as spalling, so that a thermal barrier effect can be achieved sufficiently over a long-term operation, which is the inherent purpose of the thermal-insulating ceramic layer. In addition, the decrease in temperature of the metal of the substrate constituting the component improves the reliability of component, and prolongs the service life thereof. Furthermore, since the thermal barrier effect is obtained stably, the amount of blade cooling air for the gas turbine blade can be decreased, and the turbine efficiency can be enhanced.

In the present invention, it is preferable that the alloy used for the bond coat consists substantially of at least one element of nickel and cobalt, chromium and aluminum. However, it can contain at least one element selected from a group consisting of tantalum, cesium, tungsten, silicon, platinum, manganese and boron can be contained in a range of 0 to 20 wt % (including zero percent). It is preferable that at least one element of nickel and cobalt is contained, in a total amount of which is in a range of 50 to 75 wt %, that 5 to 40 wt % of chromium is contained, and that 1 to 30 wt % of aluminum is contained.

Nickel and/or cobalt are/is essential element(s) for the alloy forming the bond coat. At least one element of nickel and cobalt is preferably contained, a total amount of which is 50 to 75 wt %, in order to provide the equivalent thermal expansion coefficient etc. to the heat resistant alloy of substrate by means of providing the similar alloy composition. If the amount thereof is lower than 50 wt %, a bond coat having high ductility is difficult to be formed. If the amount thereof is higher than 75 wt %, the corrosion resistance and the oxidation resistance decrease because amounts of chromium and aluminum become low. Chromium and aluminum are elements for forming a protective oxide film that provides the corrosion resistance and the oxidation resistance. Chromium mainly contributes to the corrosion resistance, and aluminum mainly contributes to the oxidation resistance. If the amount of chromium is lower than 5 wt % or the amount of aluminum is lower than 1 wt %, an effect of improving the corrosion resistance and the oxidation resistance becomes little. If the amount of chromium exceeds 40 wt % or the amount of aluminum exceeds 30 wt %, the film is easily subjected to be embrittled. One element selected from a group consisting of tantalum, cesium, tungsten, silicon, platinum, manganese and boron has an effect of fixing impurities in the bond coat and of enhancing the adhesion between the substrate and the bond coat and the adhesion of the protective oxide film. An element that is easier to be oxidized than aluminum, such as yttrium, hafnium (Hf), cerium (Ce), lanthanum (La), thorium (Th), samarium (Sm), and neodymium (Nd), is not contained in the alloy forming the bond coat. Thereby, a decrease in oxygen insulating properties due to mixing of such an element in aluminum oxides is suppressed.

The bond coat is most favorably formed by a low-pressure plasma spray technique. However, a high velocity flame spray technique such as a high velocity oxy-fuel spray technique and a high velocity air-fuel spray technique can also be used. In the case of spraying, there is a possibility of mixing a minute amount of a material of a vessel, crucible, atomization nozzle, and the like, during steps such as agglomeration, fusing, crushing, and atomization in the manufacturing process of alloy powder. There is also a possibility of mixing a minute amount of material of an electrode, spray nozzle, and the like, during spraying. Thus, these are unavoidable impurities, and are allowed to be included as unavoidable impurities.

Figure 1:
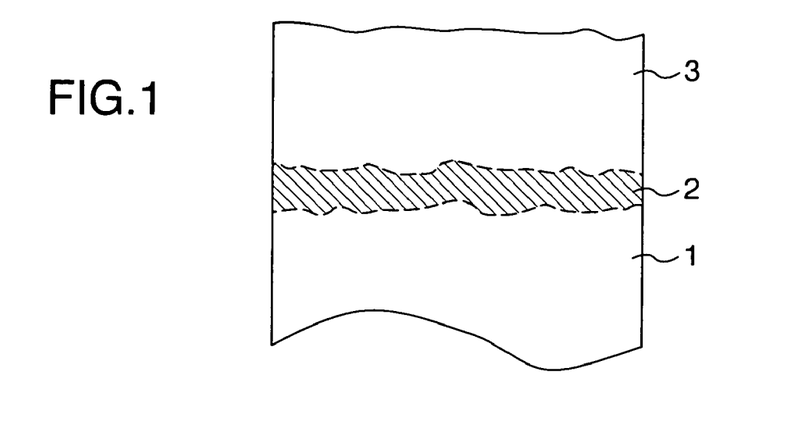
FIG. 1 is a schematic cross-sectional view of a high temperature component according to an embodiment of the present invention.
Figure 2:
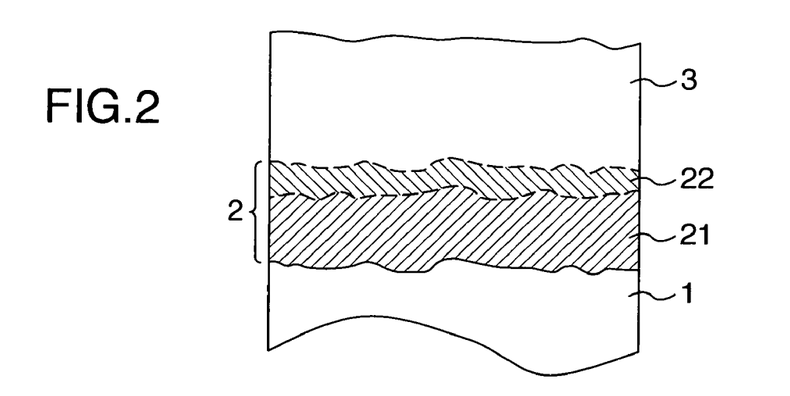
FIG. 2 is a schematic cross-sectional view of a high temperature component according to another embodiment of the present invention.

The high temperature component according to the present invention comprise essentially a substrate 1, the bond coat 2, and the top coat 3 as shown in FIG. 1. As shown in FIG. 2, the bond coat 2 may have a two-layer structure. In this case, the bond coat 2 is formed of a second layer 22 which consists substantially of at least one element of nickel and cobalt, chromium, aluminum and at least one element selected from a group consisting of tantalum, tungsten, silicon, platinum, manganese and boron in the range of 0 to 20 wt % (including zero percent), and a first layer 21 which is made of an MCrAlX alloy, wherein M represents at least one element selected from a group consisting of cobalt, nickel and iron, and X represents at least one element selected from a group consisting of yttrium, hafnium, tantalum, cerium, lanthanum, thorium, tungsten, silicon, platinum, manganese and boron. In the case where the top coat is not formed on the whole surface of bond coat, and a part of bond coat is exposed, the high temperature component having the bond coat of this structure is preferable because the exposed portion has securely the corrosion resistance and the oxidation resistance.

$ZrO_2$-based ceramics are preferable for the top coat 3. In particular, partially stabilized zirconia containing at least one selected from $Y_2O_3$, MgO, CaO, $CeO_2$, $Sc_2O_3$, $Er_2O_3$, $Gd_2O_3$, $Yb_2O_3$, $Al_2O_3$, $SiO_2$, and $La_2O_3$ is preferable. Yttria partially stabilized zirconia is more preferable.

In order to improve the durability of TBC, following techniques are known: forming a porous top coat by using an atmospheric plasma spray technique to suppress crack propagation therein; producing a vertical crack in the top coat to relieve thermal stress; forming top coat having a columnar structure by using an electron-beam physical vapour deposition technique to relieve thermal stress by the separation between the columnar structures; and the like. In the present invention, these processes can be used as well for the top coat.

EXAMPLE 1

As a specimen for a substrate, a nickel-based super-alloy (IN738LC: Ni-16 wt % Cr-8.5 wt % Co-1.7 wt % Mo-2.6 wt % W-1.7wt % Ta-0.9 wt % Nb-3.4 wt % Al-3.4 wt % Ti') having a disc shape with a diameter of 25 mm and a thickness of 5 mm was used. A bond coat was formed on the substrate by a low-pressure plasma spray technique using CoNiCrAl alloy (Co-32 wt % Ni-21 wt % Cr-8 wt % Al) powder, and heat-treated at a temperature of 1121° C. for 4 hours under vacuum, as diffusion heat treatment. The thickness of the bond coat was about 100 μm. Subsequently, a top coat with a thickness of about 200 μm was formed onto the bond coat on the substrate by the atmospheric plasma spray technique using yttria partially stabilized zirconia ($ZrO_2$-8 wt % $Y_2O_3$) powder.

To evaluate the effect for suppressing growth of the interface oxide according to the present invention, an atmospheric oxidation test was conducted at 950° C. for 1000 hours on the specimen prepared by the above-described method. The result is given as No.1 in Table 1. For comparison, a specimen in which the material of the bond coat is replaced by a CoNiCrAlY alloy (Co-32 wt % Ni-21 wt % Cr-8 wt % Al-0.5 wt % Y) was also prepared, and the result thereof is given as No. 2 in Table 1.

TABLE 1

| Specimen | | | Thickness (μm) of interface oxide layer after oxidation test at 950° C. for 1000 hours |
|---|---|---|---|
| No. 1 | Present Invention | Bond coat: CoNiCrAl alloy | 3 |
| No. 2 | Comparative example | Bond coat: CoNiCrAlY alloy | 6 |

As is apparent from Table 1, it was found that the interface oxide layer after oxidation test of No. 1 specimen according to the present invention grows to a half of the thickness of that of No. 2 specimen, and thus has an excellent effect of suppressing the growth of interface oxide.

EXAMPLE 2

The same specimen for the substrate as that of Example 1 was used, and a bond coat was formed on the surface thereof by the low-pressure plasma spray technique using NiCoCrAl alloy (Ni-23 wt % Co-17 wt % Cr-12.5 wt % Al) powder. It was heat-treated at 1121° C. for 4 hours under vacuum, as diffusion heat treatment. The thickness of bond coat was about 100 μm. Subsequently, top coats of yttria partially stabilized zirconia ($ZrO_2$-8 wt % $Y_2O_3$) were formed onto the bond coat on the substrate by the following four methods so as to have a thickness of about 200 μm.

A first method: a top coat having a porosity of about 10% was formed by the atmospheric plasma spray technique.

A second method: a porous top coat having a porosity of about 20% was formed by the atmospheric plasma spray technique.

A third method: a top coat having a vertical crack was formed by the atmospheric plasma spray technique.

A fourth method: a top coat having a columnar structure was formed by the electron-beam physical vapour deposition technique.

A thermal cycle test was conducted on these specimens to evaluate the durability of TBC, in which heating of the specimens at a temperature of 1100° C. for 10 hours in the air and cooling of them to 200° C. were repeated. The number of cycles until the ceramic layer of specimen spalls is given in Table 2. Spalling was judged to occur when the spalling area of ceramic layer becomes 20% or more of the whole area, and the number of cycles until then was determined. As comparative examples, specimens in which the bond coat is made of a NiCoCrAlY alloy (Ni-23 wt % Co-17 wt % Cr-12.5 wt % Al-0.5 wt % Y) are given in Table 2.

TABLE 2

|  |  | Specimen | Number of cycles reaching spalling |
|---|---|---|---|
| No. 3 | Present Invention | Bond coat: NiCoCrAl alloy<br>Top coat: atmospheric spray (porosity 10%) | 25 |
| No. 4 | Present Invention | Bond coat: NiCoCrAl alloy<br>Top coat: atmospheric spray (porous) | 62 |
| No. 5 | Present Invention | Bond coat: NiCoCrAl alloy<br>Top coat: atmospheric spray (vertical crack) | 143 |
| No. 6 | Present Invention | Bond coat: NiCoCrAl alloy<br>Top coat: electron beam deposition (columnar structure) | 160 |
| No. 7 | Comparative example | Bond coat: NiCoCrAlY alloy<br>Top coat: atmospheric spray (porosity 10%) | 20 |
| No. 8 | Comparative example | Bond coat: NiCoCrAlY alloy<br>Top coat: atmospheric spray (porous) | 43 |
| No. 9 | Comparative example | Bond coat: NiCoCrAlY alloy<br>Top coat: atmospheric spray (vertical crack) | 84 |
| No. 10 | Comparative example | Bond coat: NiCoCrAlY alloy<br>Top coat: electron beam deposition (columnar structure) | 65 |

As is apparent from Table 2, it was found that in the case where the top coat is formed by the same method, the TBC according to the present invention has better thermal cycle tolerance than that of comparative examples, and thus, has an effect of improving the durability due to a growth suppressing effect of interface oxide. It was also found that comparing the method for forming the top coat, the fourth method has the best thermal cycle tolerance, and in the next place the properties are better in the order of the third method and the second method.

EXAMPLE 3

The same specimen for the substrate as that of Example 1 was used, and a bond coat was formed by the low-pressure plasma spray technique. The bond coat was formed so as to have a two-layer structure. For a first layer on the substrate side, a CoNiCrAlY alloy (Co-32 wt % Ni-21 wt % Cr-8 wt % Al-0.5 wt % Y) was formed so as to have a thickness of about 100 μm, and for a second layer, a CoNiCrAl alloy (Co-32 wt % Ni-21 wt % Cr-8 wt % Al) was formed so as to have a thickness of about 50 μm. Subsequently, it was heat-treated at 1121° C. for 4 hours under vacuum, as diffusion heat treatment. Thereafter, a top coat with a thickness of about 200 μm and a diameter of 15 mm was formed at the center of the specimen by the atmospheric plasma spray technique using yttria partially stabilized zirconia ($ZrO_2$-8 wt % $Y_2O_3$) powder with using a metallic mask. A specimen was also prepared in which the bond coat was formed as a single layer with a thickness of about 150 μm made of a CoNiCrAl alloy (Co-32 wt % Ni-21 wt % Cr-8 wt % Al), on a part of which the top coat was formed. Furthermore, a specimen was also prepared in which the bond coat was formed as a single layer of a CoNiCrAlY alloy (Co-32 wt % Ni-21 wt % Cr-8 wt % Al-0.5 wt % Y) with a thickness of about 150 μm. To evaluate the oxidation resistance in the portion where the top coat is absent, a thermal cycle test was conducted on these specimens, in which heating of the specimens at a temperature of 1000° C. for 10 hours in the air and cooling of them to 200° C was repeated one hundred times. The test results are given in Table 3.

TABLE 3

|  |  | Specimen | Thickness (μm) of interface oxide layer | Maximum oxidation depth (μm) on portion where top coat is absent |
|---|---|---|---|---|
| No. 11 | Present Invention | Bond coat: CoNiCrAlY alloy + CoNiCrAl alloy (two layers) | 10 | 18 |
| No. 12 | Present Invention | Bond coat: CoNiCrAl alloy (single layer) | 8 | 43 |
| No. 13 | Comparative example | Bond coat: CoNiCrAlY alloy (single layer) | 21 | 36 |

No damages such as spalling of the top coat were observed in any of the specimens. As the result of cross-sectional observation, the thickness of the interface oxide layer formed between the top coat and the bond coat was 10 μm or less for both of No. 11 and No. 12 specimens, while the thickness was about 21 μm for No. 13 specimen.

In the portion where the top coat was not formed, the thickness of the oxide layer was nonuniform, and hence it was difficult to exactly determine the oxide film thickness. Therefore, evaluation was made by the maximum value of oxidation depth measured from an initial interface which is determined to be a portion where the top coat starts. The maximum oxidation depth became shallower in the order of No. 11, No. 13 and No. 12 specimens. As for the growth of oxide in the portion where the top coat was absent, the oxidation depth of No. 11 specimen was smallest. The reason thereof is considered to be as follows. In addition to the formation of a highly protective oxide layer on the surface of the second layer for No. 11 specimen, yttrium contained in the first layer diffuses gradually in the second layer and reaches the surface of the layer during a process in which oxidation proceeds at the time of diffusion heat treatment and at the time when the specimen is held at a high temperature in the test, thereby an anchoring effect of protective oxide layer on the surface is achieved and the adhesion is improved. Thus, the highly protective oxide is kept for long-term thermal exposure. On the other hand, for No. 12 specimen in which the bond coat does not contain yttrium, it is considered that no anchoring effect was achieved although a highly protective oxide is formed, so that local spalling occurred in the surface oxide layer having an increased film thickness at the portion where the top coat is absent during the oxidation process under high oxygen partial pressure. Thus, the maximum oxidation depth for No. 12 was increased. In addition, for No. 13 specimen, it is considered that the mixing of yttrium oxide in the protective oxide layer decreased the protecting properties, although spalling of oxide layer does not occur due to the anchoring effect achieved by the addition of yttrium, so that the maximum oxidation depth was also increased.

From the above, in the case where the portion in which the top coat is not provided, it is preferable that the bond coat is formed so as to have a two-layer structure having a layer made of an MCrAl alloy and a layer made of an MCrAlX alloy, and that the MCrAl alloy layer is an upper layer.

EXAMPLE 4

Figure 6:
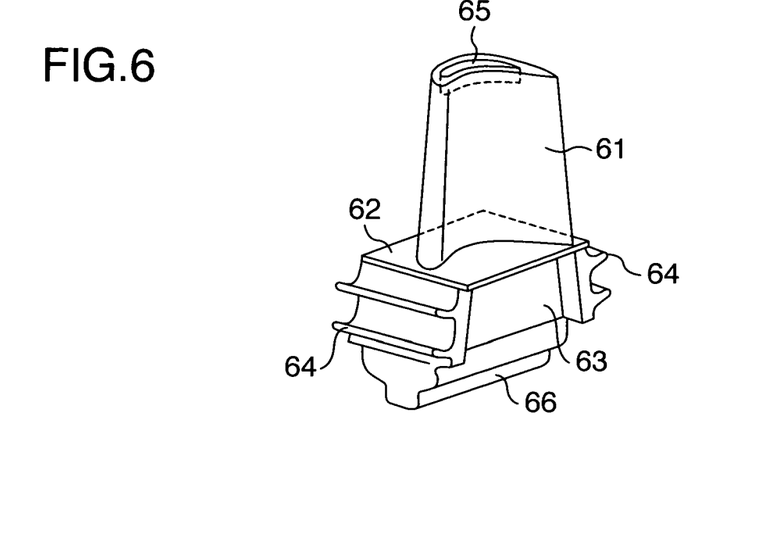
FIG. 6 is a perspective view of a turbine bucket provided with a TBC according to the present invention.

A TBC gas turbine bucket was manufactured. FIG. 6 is a perspective view showing the whole configuration of the gas turbine bucket. In FIG. 6, this gas turbine bucket is used as a first-stage bucket of a rotating portion of a gas turbine provided with three-stage buckets for example. The bucket was made of a nickel-based heat resistant alloy (Rene'-80:Ni-14% Cr-4% Mo-4% W-3% Al-5% Ti-9.5% Co). It has an airfoil portion 61, a platform portion 62, a shank 63, a seal fin 64, and a tip pocket 65, and is attached to a disc via a dovetail 66. This bucket has a blade portion having a length of 100 mm, and a length below the platform portion 62 is 120 mm. In the bucket, an internal cooling passage (not shown) is provided from the dovetail 66 through the airfoil portion 61 so that a cooling medium, especially air or steam, passes through to cool the bucket from the interior thereof. This TBC bucket is most excellent when being used for the first stage, but it can be also provided as the buckets of the second or later stages. In this gas turbine blade, the TBC according to the present invention was formed in the airfoil portion 61 and the platform portion 62, which are exposed to combustion gas. The film was formed by almost the same method as that in Example 2. A bond coat with a thickness of about 200 μm was formed on the surface of bucket by the low-pressure plasma spray technique using NiCoCrAl alloy (Ni-23 wt % Co-17 wt % Cr-12.5 wt % Al) powder, and a top coat with a thickness of about 300 μm made of yttria partially stabilized zirconia ($ZrO_2$-8 wt % $Y_2O_3$) having a vertical crack structure was formed on the bond coat by the atmospheric plasma spray technique.

Figure 8:
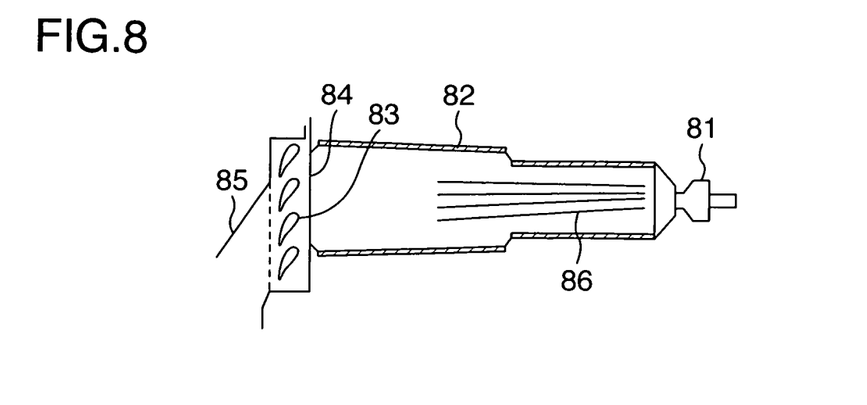
FIG. 8 is a schematic view of a heating test apparatus for simulating an actual machine.

The turbine bucket manufactured as described above was subjected to oxidation treatment of 1000° C. for 1000 hours in the air in order to simulate the oxidized state after long-term use. Then it was subjected to a thermal load test by using a heating test apparatus for simulating an actual machine, shown in FIG. 8. In this test apparatus a high-temperature and high-pressure combustion gas 86 is guided into a combustion liner 82, and is exhausted from an exhaust air duct 85 after heating test blades 83 provided on a blade holding stand 84. The interior of the test blade 83 is cooled by a cooling air, so that a test simulating the thermal load of the actual machine can be carried out. The test conditions were as follows: the combustion gas temperature was 1500° C. at a maximum; the cooling air temperature was 170° C.; and the pressure was 8 atmospheres. The blade substrate temperature in heating was measured by a thermocouple embedded beforehand in the leading edge portion of the bucket. As the result, the heat flux was 3.0 $MW/m^2$ at a maximum. For comparison, a turbine bucket in which the bond coat was formed of a NiCoCrAlY alloy (Ni-23 wt % Co-17 wt % Cr-12.5 wt % Al-0.5 wt % Y) was also manufactured.

In the case where the combustion gas temperature was 1000° C. (heat flux: 0.9 $MW/m^2$), a cycle of start, steady holding and stop, which was repeated 10 times, does not damage to the TBC on both of the turbine bucket according to the present invention and that of comparative example. However, in the case where the combustion gas temperature was 1300° C. (heat flux: 1.5 $MW/m^2$), after the cycle was repeated 10 times, spalling of the top coat was observed in a part of leading edge and suction side of the turbine blade of comparative example. The turbine blade according to the present invention was sound. Furthermore, in the case where the combustion gas temperature was 1500° C. (heat flux: 3.0 $MW/m^2$), even after the cycle was repeated 10 times, the turbine blade according to the present invention was entirely sound. For the turbine blade of comparative example, the damage range at the leading edge and on the suction side was expanded as compared with the case where the heating temperature was 1300° C., and spalling damage was also observed in a part of pressure side.

From the above result, it was found that the turbine bucket provided with the TBC according to the present invention has higher durability than the conventional turbine bucket.

EXAMPLE 5

Figure 7:
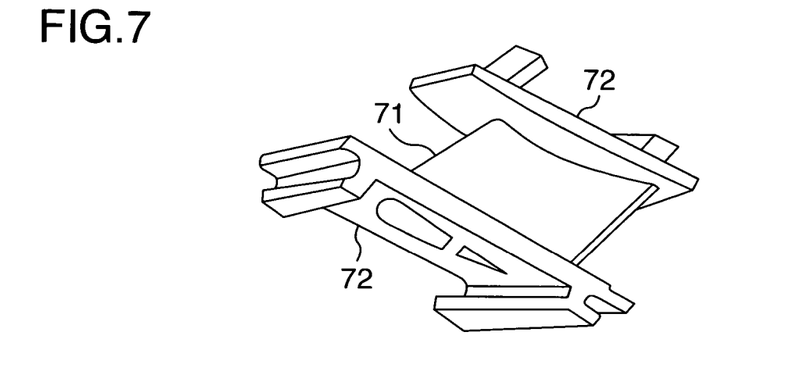
FIG. 7 is a perspective view of a turbine nozzle provided with a TBC according to the present invention.

A TBC gas turbine nozzle was manufactured. FIG. 7 is a perspective view showing the whole configuration of the gas turbine nozzle. In FIG. 7, this gas turbine nozzle is used as a first-stage nozzle of a gas turbine provided with three-stage nozzle for example. The nozzle was made of a cobalt-based heat resistant alloy (FSX414: Co-10 wt % Ni-29 wt % Cr-7.5 wt % W-1% Fe-0.4% Mn-0.8% Si), and has an airfoil portion 71 and an end wall portion 72. In the nozzle, an internal cooling passage (not shown) is provided from the end surface of the end wall portion 72 through the airfoil portion 71 so that a cooling medium, especially air or steam, passes through in order to cool the nozzle from the interior thereof. This TBC nozzle is most excellent when being used for the first stage, but it can also be provided as the second or later stage. In this gas turbine nozzle, the TBC was formed on the inside surfaces of the airfoil portion 71 and the end wall portion 72, which are exposed to combustion gas, by the method of Example 1. Specifically, a bond coat with a thickness of about 200 μm was formed on the surface of the nozzle by the low-pressure plasma spray technique using CoNiCrAl alloy (Co-32% Ni-21% Cr-8% Al) powder, and a top coat with a thickness of about 300 μm made of yttria partially stabilized zirconia ($ZrO_2$-8 wt % $Y_2O_3$) having a vertical crack structure was provided on the bond coat by the atmospheric plasma spray technique.

The turbine nozzle manufactured as described above was subjected to oxidation treatment of 1000° C. for 1000 hours in the air in order to simulate the oxidized state after long-term use. Then it was subjected to a thermal load test by a heating test apparatus for simulating the actual machine in the same way as in Example 4. For comparison, a turbine nozzle in which the bond coat was made of a CoNiCrAlY alloy (Co-32% Ni-21% Cr-8% Al-0.5% Y) was also manufactured, and this turbine nozzle was subjected to the similar test.

As the result of test, in the case where the combustion gas temperature was 1500° C. (heat flux: 3.0 MW/$m^2$), even after the cycle was repeated 10 times, the turbine nozzle according to the present invention was entirely sound, but in the turbine nozzle of comparative example, spalling damage of the top coat occurred in a part of leading edge, suction side, and pressure side thereof. From this result, it was found that the turbine nozzle according to the present invention has higher durability than the conventional turbine nozzle.

The high temperature component with a thermal barrier ceramic coating according to the present invention has a very high durability at high temperatures. Therefore, the high temperature component is suitable as a thermal barrier coating for the bucket, nozzle, combustor, and the like of a gas turbine. Also, it is suitable as a thermal barrier coating of not only a gas turbine but also an aircraft gas turbine engine.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A high temperature component with a thermal barrier coating, consisting of:
   a heat resistant alloy substrate composed mainly of at least one of nickel and cobalt;
   a bond coat formed by low-pressure plasma spray on the substrate; and
   a top coat formed of zirconia based ceramic on a surface of the bond coat,
   wherein the bond coat is formed of a Ni—Co—Cr—Al, the alloy consisting of:
   nickel and cobalt, a total amount of which is in a range of 50 to 75 wt %;
   5 to 40 wt % of chromium;
   1 to 30 wt % of aluminum; and
   unavoidable impurities.

2. The high temperature component with a thermal barrier coating according to claim 1, wherein the oxide-based ceramic of the top coat is made of partially stabilized zirconia.

3. The high temperature component with a thermal barrier coating according to claim 2, wherein the partially stabilized zirconia is yttria partially stabilized zirconia.

4. The high temperature component with a thermal barrier coating according to claim 1, wherein the bond coat is formed on a surface of the substrate.

5. A gas turbine, wherein at least a part of at least one of a combustor, a gas turbine bucket, and a gas turbine nozzle is formed of the high temperature component with a thermal barrier coating according to claim 1.

6. The high temperature component with a thermal barrier coating according to claim 1, wherein a substantially pure aluminum oxide is formed between the bond coat and the top coat, through an oxidation of the bond coat during usage.

7. A high temperature component with a thermal barrier coating, consisting of:
   a heat resistant alloy substrate composed mainly of at least one of nickel and cobalt;
   a bond coat formed by low-pressure plasma spray on the substrate; and
   a top coat formed of zirconia based ceramic on a surface of the bond coat,
   wherein the bond coat consists of:
   a first layer made of an MCrAlX alloy, wherein M is at least one element selected from a group consisting of cobalt, nickel and iron, and X is at least one element selected from a group consisting of yttrium, hafnium, tantalum, cerium, lanthanum, thorium, tungsten, silicon, platinum, manganese and boron; and
   a second layer made of an alloy consisting of:
   nickel and cobalt, a total amount of which is in a range of 50 to 75 wt %;
   5 to 40 wt % of chromium;
   1 to 30 wt % of aluminum;
   at least one element selected from a group consisting of tantalum, tungsten, silicon, platinum, manganese and boron in a range of 0 to 20 wt %; and
   unavoidable impurities, and
   wherein the second layer is on the first layer, and the top coat is on the second layer.

8. The high temperature component with a thermal barrier coating according to claim 7, wherein X in the first layer is yttrium.

9. The high temperature component with a thermal barrier coating according to claim 7, wherein the first layer is made of a CoNiCrAlY alloy or a NiCoCrAlY alloy.

10. The high temperature component with a thermal barrier coating according to claim 7, wherein the top coat is formed in a region on a part of the second layer, and the remaining part of the second layer is exposed.

11. A gas turbine provided with a high temperature component with a thermal barrier coating, the high temperature component consisting of:
    a heat resistant alloy substrate composed mainly of at least one of nickel and cobalt;
    a bond coat formed by low-pressure plasma spray on the substrate; and
    a top coat formed of zirconia based ceramic on a surface of the bond coat,
    wherein the bond coat is formed of a Ni—Co—Cr—Al alloy, the alloy consisting of:
    nickel and cobalt, a total amount of which is in a range of 50 to 75 wt %;
    5 to 40 wt % of chromium;
    1 to 30 wt % of aluminum; and
    unavoidable impurities.

12. The gas turbine according to claim 11, wherein the oxide-based ceramic of the top coat is made of partially stabilized zirconia.

13. The gas turbine according to claim 12, wherein the partially stabilized zirconia is yttria partially stabilized zirconia.

14. The gas turbine according to claim 11, wherein the bond coat is formed on a surface of the substrate.

15. A gas turbine provided with a high temperature component with a thermal barrier coating, the high temperature component consisting of:
    a heat resistant alloy substrate composed mainly of at least one of nickel and cobalt;
    a bond coat formed by low-pressure plasma spray on the substrate; and a top coat formed of zirconia based ceramic on a surface of the bond coat, wherein the bond coat consists of:

a first layer made of an MCrAlX alloy, wherein M is at least one element selected from a group consisting of cobalt, nickel and iron, and X is at least one element selected from a group consisting of yttrium, hafnium, tantalum, cerium, lanthanum, thorium, tungsten, silicon, platinum, manganese and boron; and a second layer made of an alloy consisting of:

nickel and cobalt, a total amount of which is in a range of 50 to 75 wt %;

5 to 40 wt % of chromium;

1 to 30 wt % of aluminum;

at least one element selected from a group consisting of tantalum, tungsten, silicon, platinum, manganese and boron in a range of 0 to 20 wt %; and unavoidable impurities, and wherein the second layer is on the first layer, and the top coat is on the second layer.

16. The gas turbine according to claim 15, wherein the first layer is made of a CoNiCrAlY alloy or a NiCoCrAlY alloy.

17. The gas turbine according to claim 15, wherein the top coat is formed in a region on a part of the second layer, and the remaining part of the second layer is exposed.

18. The gas turbine according to claim 15, wherein X in the first layer is yttrium.

* * * * *